(12) United States Patent
Pax et al.

(10) Patent No.: US 9,387,727 B2
(45) Date of Patent: Jul. 12, 2016

(54) HYBRID STEEL-TEXTILE REINFORCEMENT PLY FOR RADIAL TIRES

(75) Inventors: Gabrielle Milly Pax, Feulen (LU); Javier Del Rio Rodriguez, Lille (FR); Patrick Dekeyzer, Deerlijk (BE)

(73) Assignee: NV BEKAERT SA, Zwevegem (BE)

( * ) Notice: Subject to any disclaimer, the term of this patent is extended or adjusted under 35 U.S.C. 154(b) by 794 days.

(21) Appl. No.: 13/387,397

(22) PCT Filed: Jul. 15, 2010

(86) PCT No.: PCT/EP2010/060204
§ 371 (c)(1),
(2), (4) Date: Jan. 27, 2012

(87) PCT Pub. No.: WO2011/012454
PCT Pub. Date: Feb. 3, 2011

(65) Prior Publication Data
US 2012/0118453 A1    May 17, 2012

(30) Foreign Application Priority Data

Jul. 27, 2009 (EP) .................................. 09166507

(51) Int. Cl.
*B60C 9/18*   (2006.01)
*D04B 21/20*  (2006.01)

(52) U.S. Cl.
CPC ............... *B60C 9/18* (2013.01); *D04B 21/202* (2013.01); *Y10T 152/10* (2015.01); *Y10T 442/339* (2015.04)

(58) Field of Classification Search
CPC ....... D04B 21/00; D04B 21/20; D04B 21/202
USPC ................... 66/190, 192, 193; 442/313, 314; 152/563

See application file for complete search history.

(56) References Cited

U.S. PATENT DOCUMENTS

| | | | | |
|---|---|---|---|---|
| 1,811,081 A | * | 6/1931 | Hartwell | 139/425 R |
| 2,157,606 A | * | 5/1939 | Harris | 66/193 |
| 2,202,013 A | | 5/1940 | Lougheed | |
| 2,884,044 A | | 4/1959 | Hulswit, Jr. et al. | |
| 3,238,689 A | * | 3/1966 | Cook, Jr. | 52/716.5 |
| 3,273,978 A | | 9/1966 | Paul | |
| 3,424,220 A | * | 1/1969 | Schuerch | 152/339.1 |
| 3,815,652 A | * | 6/1974 | Pouilloux | 152/542 |

(Continued)

FOREIGN PATENT DOCUMENTS

| | | |
|---|---|---|
| EP | 1332894 A2 | 8/2003 |
| EP | 1646750 | 4/2006 |

(Continued)

OTHER PUBLICATIONS

International Search Report and Written Opinion of ISA in PCT/EP2010/060204, dated Oct. 6, 2010.

(Continued)

*Primary Examiner* — Danny Worrell
(74) *Attorney, Agent, or Firm* — Bacon & Thomas, PLLC (57) ABSTRACT

The present invention relates to a hybrid steel-textile reinforcement ply for tires comprising at least one continuous steel cord (2), and at least one textile yarn (3), wherein the continuous steel cord (2) is weft inserted in the textile yarn (3) essentially perpendicular to the longitudinal axis of the weft direction and wherein the steel cord (2) in the reinforcement ply (1) has continuous edges (4) as well as to a method for producing such a reinforcement ply.

10 Claims, 5 Drawing Sheets

(56) References Cited

U.S. PATENT DOCUMENTS

| | | | |
|---|---|---|---|
| 3,842,628 A * | 10/1974 | Bennett et al. | 66/193 |
| 3,949,129 A | 4/1976 | Hubbard | |
| 4,413,033 A * | 11/1983 | Weichman | 428/122 |
| 4,467,006 A | 8/1984 | Hasegawa et al. | |
| 4,506,717 A | 3/1985 | Thise-Fourgon | |
| 5,394,906 A | 3/1995 | Farley | |
| 5,394,920 A * | 3/1995 | Siegenthaler | 152/563 |
| 5,416,961 A * | 5/1995 | Vinay | 28/165 |
| 5,695,578 A | 12/1997 | Boiocchi et al. | |
| 6,089,051 A * | 7/2000 | Gorywoda et al. | 66/170 |
| 6,150,003 A * | 11/2000 | McCutchan, Jr. | 428/105 |
| 6,270,606 B1 * | 8/2001 | Ueyoko | 156/117 |
| 6,461,713 B2 * | 10/2002 | King | 428/108 |
| 7,028,510 B1 * | 4/2006 | DaRosa | 66/190 |
| 7,895,863 B2 * | 3/2011 | Smith | A61F 13/08 66/172 E |

FOREIGN PATENT DOCUMENTS

| | | |
|---|---|---|
| GB | 2102035 A | 1/1983 |
| JP | 10-258609 A | 9/1998 |
| WO | 99/28547 A1 | 6/1999 |
| WO | 02/088459 A1 | 7/2002 |
| WO | 03/008207 A1 | 1/2003 |
| WO | 2005/014924 A1 | 2/2005 |
| WO | 2005/014925 A1 | 2/2005 |
| WO | 2008/080715 A1 | 7/2008 |
| WO | 2009/073761 A1 | 6/2009 |

OTHER PUBLICATIONS

International Preliminary Report on Patentability in PCT/EP2010/060204, dated Jan. 31, 2012.

* cited by examiner

HYBRID STEEL-TEXTILE REINFORCEMENT PLY FOR RADIAL TIRES

TECHNICAL FIELD OF THE INVENTION

The present invention relates to a hybrid steel/textile reinforcement ply for tires and a method of manufacturing the same.

It applies more particularly, but not exclusively, to a reinforcement ply for radial tires for passenger cars or commercial/heavy load vehicles (truck, bus, off-the-road vehicles) and a method of manufacturing the same.

BACKGROUND OF THE INVENTION

At present, radial tires are an assembly of a series of components including a carcass, belt, cap ply—which are all embedded in rubber—and a rubber tread. The tire carcass conventionally supports the circumferential rubber tread which also contains a circumferential belt ply between the tire carcass and tread composed of, for example, a cord reinforcement which can be, for instance, a filamentary steel cord.

The carcass is usually formed from steel cords in truck tires and polymer yarn in the case of passenger car tires. The belt can be composed of one or more layers of plies of tire cords that are steel cord, glass fibres, polyester, nylon, aramid or rayon. The belt is positioned in the crown region of the carcass and interposed between the carcass and the cap ply. The cap ply usually consists of textile cords although steel cord reinforced cap plies are being developed (see e.g. EP1332894, WO 2003/008207).

Each component in the tire construction has a specific function in the service and performance of the final product. For instance, the belt plies act to restrict the movement of the tread and give the tire better road-holding and handling properties. Support of this type is particularly important in a radial tire where the carcass is formed from a rubberized woven fabric having relatively inextensible reinforcement cords running transversely, i.e. radially from bead to bead. The function of the cap ply is to protect the steel belts from delaminating by centrifugal force and especially when the movement of the steel cords of the belt plies at higher speeds creates excessive temperatures in the tire.

Problems with the current belt construction are well known in the industry. The belt ply is now manufactured by cutting an array of rubber encased steel cords at an angle and splicing these pieces together to form a continuous array of steel cords at an angle to the equator of the tyre. A drawback of the present design of the belts is that the steel cord ends can cut and damage the neighbouring rubber parts during the dynamic loading of the tire in service. Furthermore, the cut ends—showing bare steel—do not adhere well to rubber and can be subjected to corrosion. These negative effects appear at the edges of the carcass layer and can affect the lifetime of a tire by a failure mode commonly known as 'belt edge separation'.

An example for the architecture of belt plies can be found in U.S. Pat. No. 5,695,578. Here, it is described that two belt plies are each made from a first and a second series of cords of different material. The cords are alternated with each other axially across the width of the tire according to a preestablished sequence. The different materials cooperate with each other to withstand tensile stresses in the longitudinal direction. However, the belt plies of this example still are cut at the edges involving the drawbacks induced by that mentioned above.

On the other hand, JP10258609 describes a belt ply that comprises of continuous steel cord which is coiled and where the coils sequentially and partially overlap. The resulting band of coils is then disposed between upper and lower rubber sheets. Like that, cut edges are avoided but the coiled belt ply structure of JP 10258609 A has a variety of other drawbacks especially in view of the production because the coils of steel cord tend to twist around each other and can easily be displaced in the process of being incorporated between the rubber sheets. Moreover, fretting of the overlapping parts of the coils can cause problems as well due to a possible local built-up at the large overlap areas.

SUMMARY OF THE INVENTION

It is an object of the present invention to provide an alternative hybrid textile reinforcement ply for tires and a method of manufacturing the same.

Embodiments of the present invention provide a reinforcement ply for radial tires for wheeled vehicles such as passenger cars or commercial/heavy load vehicles for use on trucks, busses, or off-the-road applications and a method of manufacturing the same.

This object is accomplished by a hybrid steel-textile reinforcement ply according to the present invention.

The present invention provides a hybrid steel-textile woven or knitted reinforcement ply for tires having edges along the warp direction, comprising:
  at least one continuous metallic reinforcement, preferably a steel cord, and
  at least one textile yarn,
wherein the continuous steel cord is weft inserted in the textile yarn and wherein the steel cord in the edges of the reinforcement ply is continuous.

The present invention proposes a new design of reinforcement that is intended to substitute the belt ply and/or carcass, and is based on a hybrid steel-textile that is composed of continuous steel cord and a textile yarn. The steel cord is preferably any cord comprising one or more steel filaments. For instance, the steel cord can be a single steel filament or can be composed of a textile fibre surrounded by steel filaments such as presented in WO2009073761. The textile yarn is preferably a polymeric fibre or cord like a polyamide or a polyester fibre.

The current invention eliminates cut steel cord ends at the edges of the ply and results in diminished separation and corrosion risk. There will necessarily remain a very few such as at least two cut ends of the steel cord in a belt ply of the new proposed steel-textile reinforcement in accordance with embodiments of the present invention. In fact there will be at least 2 cut ends per cord used to make the ply. If breakages or run-out occur these may result in further cut ends but these should be in total very few in number, e.g. less than 10 in total. The cut or broken ends can be positioned in a place or places that minimize(s) corrosion risk. Additionally, cut ends can be eliminated completely from the edges of the ply in the warp direction. The elimination of sharp cord ends at the ply edges will also limit the mechanical damaging of any neighbouring parts such as neighbouring rubber parts.

Since the cords are joined together by a textile material, i.e. the steel cords are trapped by stitching, the offset position of the steel cords relative to each other is more controlled than for the existing cut and spliced version of the belt. Indeed, the single steel cord sections folded back and forth between the edges remain substantially parallel to one another as they are held by the textile material. The special 3D design of the present invention also has beneficial mechanical properties and integrity of the ply and may allow even to skip the cap ply from the tire design.

In a preferred embodiment of the present invention the steel cord can be weft inserted in the textile yarn in a maximum skewed angle of ±15° from the essentially perpendicular orientation to the warp direction of the ply. Once a ply is produced, it is relatively easy to implement mechanical techniques that will provide a displacement of each side of the tape with respect to each other to induce a skewing of the material to dispose the steel-cords at an angle other than the original direction, perpendicular to the warp direction of the ply. One example of a displacement technique that could conceivably be employed is by using displacement pin wheels.

In another preferred embodiment of the present invention two continuous steel cords are alternately weft inserted in the textile yarn. A further preferred embodiment comprises three or more continuous steel cords that are in turn weft inserted in the textile yarn. These one, two are three continuous steel cords are arranged substantially parallel to one another and form a layer of reinforcement cords in the ply.

The steel cord can be weft inserted in a shuttle. If one steel cord and one steel cord shuttle is employed, then the density of the wefts would be limited by the need to accommodate the bending radius of the steel cord at the edges as the steel cord is looped back to make the next weft (hence avoiding a cut edge). To overcome this, it is advantageous that two or more shuttles and two or more steel cords are employed in a subsequent manner so each shuttle waits at an edge for some predefined number of weaving cycles, so there is only one weft steel cord in each shed. Alternating shuttles as described above has been historically employed to change colours in a textile cloth. Due to speed restrictions, these machines are no-longer used in the textile industry. An additional advantage of employing more than one shuttle is that each shuttle can float for a while at the edge, resulting in a longer radius before the steel cord returns in the other direction, thereby minimizing the bulgy-parts at the edges. Finally, the possibility of displacing the weft at an angle other than perpendicular to the warp direction of the ply is well known, as described for example in U.S. Pat. No. 5,394,906 for composite preform weaving.

Preferably, in the case where at least two steel cords are used, the two steel cords can have different twist orientations, S (left hand or counter-clockwise turning filaments or strands when evolving along the cord) and Z (right hand, clockwise turning filaments or strands when evolving along the cord), so that the twist is balanced. Two cords with opposite directions can be combined on a single shuttle which greatly improves the end-count of the ply i.e. the number of cords per transversal unit of length and leading to a good torsion balance. Then care is preferably exercised to select proper steel cords that enable rubber penetration between the pair to prevent fretting of the cords against one another. Advantageously for the product, it is possible to have alternating wefts of steel cord with different twist directions. Two shuttles, one with Z direction and the other with S direction twist, could be used to provide alternately weft with S- and Z-twist in the tape product. In this way, the tendency of the steel cord to twist on bending leading to the rise at the edge of the tape is then reduced as the residual twisting balances.

Preferably, the edges of the steel cord ply can be reinforced with a continuous cord of extensible material which runs longitudinally in the direction of the ply. In this way a cap ply integral to the ply is formed. With this it is possible to minimize belt edge separation at high driving speeds. Such an edge reinforcement material could also be a woven material such as a textile material.

The extensible material can be preferably chosen from the group comprising steel cord, glass fibre, nylon, polyester, rayon, and aramid.

When steel cord is selected for the edge reinforcement, the cord is preferably of the elongation or high elongation cord type. Such a cord shows a low modulus at low elongation which gradually increases at high elongation. That is why they are sometimes referred to as bimodal cords. Usually this is achieved by a Lang's lay type of steel cord i.e. a multistrand steel cord in which the filaments in the strands are twisted in the same direction as the strands in the cord. Examples are 3×4×0.20 SS i.e. three strands twisted in S direction, each strand comprising four filaments of 0.20 mm diameter twisted in S direction or 3×3×0.175 SS. Another alternative is to use cords with highly deformed filaments as described in EP 1036235. Such cords can stretch till the filaments are straight and then take up the load. Still another alternative is to use a hybrid steel cord wherein the core comprises a polymer monofilament that is easily compressible such as e.g. described in EP 1646750 which is incorporated herein by reference. Under load the monofilament is compressed until the strands take over the full load.

In another preferred embodiment of the present invention at least one additional reinforcement cord or cords is inserted in the weft at an angle to the warp direction of the ply, different from the angle of the first reinforcement cord layer. In this way a second reinforcement cord layer is formed. The number of weft inserted reinforcement cord layers can even be three, each of the cords having a specific angle relative to the warp direction of the ply.

In this way, there can be up to three different layers of reinforcing steel cords combined in a single ply, each of the layers comprising a specific type of steel cord or cords. All steel cords are commonly held in place by the knit textile structure. With such a reinforced ply it is possible to combine all functions of the usually at least two conventional belt plies as well as the function of the cap ply in one single ply structure.

The steel cords of the weft should be selected in function of their role in the ply:

When impact resistance of the belt is important, the same type of cords described as usable for the longitudinal edge reinforcement can be used in the weft (i.e. cords of the elongation or high elongation type).

when the belt layers have to be stiff a cord of type n×d or (n+m)×d is most preferred. The first type is made of 'n' filaments with 'n' preferably ranging from 1 to 5 filaments of a diameter 'd' (expressed in mm). Diameter 'd' can, for example, vary from 0.15 to 0.45 mm. The filaments are twisted together. The most notable example used is 2×0.30 mm. The second type '(n+m)×d' comprises two groups of filaments that are twisted around each other. One of the groups preferably has the same twist as the groups in cord, while the other group has no twist or a very long twist. The most notable example is (2+2)×0.25. Other examples as published in WO 02/088459 (incorporated herein by reference) are also useable for the inventive hybrid textile ply.

Also a single, possibly crimped or otherwise deformed, filament is possible to be used in the inventive hybrid textile ply Alternatively or additionally to the preceding the steel cord can be of a layered type with two or more layers of twisted filaments. Such preferred constructions are flexible constructions comprising many filaments that are fine. Well known examples are cords of the layered type such as three layered cords $(L+M+N) \times d$ wherein $L<M<N$. Possible examples include filament numbers in the range of $17 \geq L+M+N \geq 30$ and d can vary from 0.08 to 0.175 mm. They are built up in layers. First, L filaments are twisted together with a first lay and lay direction to a core. Then M filaments are twisted around them with a second lay direction and length, followed by still another layer with N filaments that are twisted around the L+M with still another third lay direction and length.

Also two layered constructions of type $(L+M) \times d$ are preferred. Possible examples include filament types with $L<M$ and $7 \geq L+M \geq 19$ with d also varying between 0.08 to 0.175 mm. A specific example is $(2+7) \times 0.10$.

Alternatively, but still preferred, single lay cords with M filaments all having the same lay direction and length can be used. The filaments or all filaments need not be identical. Particular examples are those published in WO 2008/080715 and WO 2005/014924.

The steel cord for the weft are by preference of the highest possible strength. At present a 0.30 mm filament has a tensile strength higher than 2950 MPa, or even higher as 3300 MPa, while 3600 MPa is also achievable.

According to another preferred embodiment of the invention at least two layers of steel cord can be super-imposed to give a 3D structure of the resulting ply.

The advantages over a single layer include that production speed is much higher; the angle of one array of cords relative to the other is fixed; and a built up of bulgy overlaps at the edges are less problematic because the overlaps are spread. Both S and Z twisted steel cords can be used to make a balanced structure.

The present invention also provides a method for manufacturing a hybrid steel-textile, woven or knitted reinforcement ply for tires comprising at least one continuous steel cord, and at least one textile yarn, wherein the continuous steel cord is weft inserted in the textile yarn and wherein the steel cord in the edges of the reinforcement ply is continuous by a weft insertion warp knit or weave technique.

There are a number of textile based methods for production of a steel-cord product of a predefined width with continuous steel cord disposed at an angle 90° to the direction of production. Since the width of the product is very small compared to the length (quasi continuous), and the thickness is very small, we will refer to this material as a "tape".

A tape with said properties can be manufactured using simple weaving techniques, where an array of textile yarns, such as polyamide, are arranged to form a shed whereby a shuttle containing steel cord is weft inserted.

Although there are numerous limitations in this technique, it is still possible but not preferred to manufacture a ply according to the present invention using this method. From a production perspective, the continuous length of production is limited to the length of steel cord on the spool in the shuttle. Replacing the spool in the shuttle results in a steel cord connection (such as a weld) in the tape. Additionally, the shuttle would be large to accommodate the spool for three reasons: the steel cord has a limited bending radius compared to textile yarns, the thickness of a steel cord is large relative to textile yarns traditionally used in shuttle tape weaving, and the length of the steel cord on the bobbin should be long to reduce the number of joins. Consequently, the speed of weaving would be slow compared to current standards because a relatively large shed would be needed to accommodate the large shuttle.

With regard to the final product, the stability of a steel cord weft and polymer yarn weave is not very stable to mechanical deformation until fixed in rubber. This could be overcome to some extent by using more intricate weaving techniques, such as leno weaving, but the speed of weaving compared to a simple plain weave is again reduced.

Another technique for manufacture of a steel cord tape is needle weaving. This technique overcomes the need for a large shed because the weft is inserted via a needle or rapier from a bobbin that does not pass between the shed from one side of the weave to the other as in shuttle weaving. The main disadvantage of this technique for tire applications is that there are two wefts in each shed. Since these two wefts always come from the same spool they have the same direction of twist, consequently, there is a high probability that the wefts will twist about each other. Two needles can also be employed, e.g. for a multiple-shuttle loom, so that there is an equal number of Z and S steel cords in the weave, but there will always be two picks per shed coming from one bobbin, so the problem of cords twisting about each other is not necessarily overcome. Another drawback of this technique is that the double weft will always have a small radius of curvature at one side of the structure, and this cannot be overcome. The possibility of displacing the weft at an angle other than 90° to the warp is also well known, in needle weaving as described in GB 2102035 which is incorporated herein by reference.

Therefore, the preferred technique according to the present invention is long throw weft insertion warp knit or crochet. This technique has the advantages of needle weaving in that the whole bobbin of steel cord is not displaced during manufacture, with an additional advantage over needle weaving in that cords cannot twist about each other. Moreover, more than one cord can be utilized in production of the product so as to balance the structure. In it's simplest form, crochet weft insertion can consist of a series of stitches, holding a steel cord. The warp knit of this technique also can be skewed to predetermined angle.

More than one steel cord can be alternately inserted to give better edges with less residual stresses, e.g. by bulgy overlaps, and balanced S and Z orientation of the steel cords. More complex stitch pattern will result in more stable structure, such as a tricot stitch instead of a simple chain. The angle is not fixed and can easily be changed from one product to another. It can be made on existing machinery.

The hybrid steel-textile reinforcement ply according to the present invention is preferably used in tires for passenger cars and/or heavy load vehicle.

Other features and advantages of the present invention will become apparent from the following detailed description, taken in conjunction with the accompanying drawings, which illustrate, by way of example, the principles of the invention.

DESCRIPTION OF THE ILLUSTRATIVE EMBODIMENTS

The present invention will be described with respect to particular embodiments and with reference to certain drawings but the invention is not limited thereto but only by the claims. The drawings described are only schematic and are non-limiting.

The present invention relates to a hybrid steel/textile reinforcement ply for tires and a method of manufacturing the same.

It applies more particularly, but not exclusively, to a reinforcement ply for radial tires for passenger cars or commercial/heavy load vehicles (truck, bus, off-the-road vehicles) and a method of manufacturing the same.

The present invention provides a hybrid steel-textile woven or knitted reinforcement ply for tires having edges along the warp direction, comprising:
  at least one continuous metallic reinforcement, preferably a steel cord, and
  at least one textile yarn,
wherein the continuous steel cord is weft inserted in the textile yarn and wherein the steel cord in the edges of the reinforcement ply is continuous.

Figure 1:
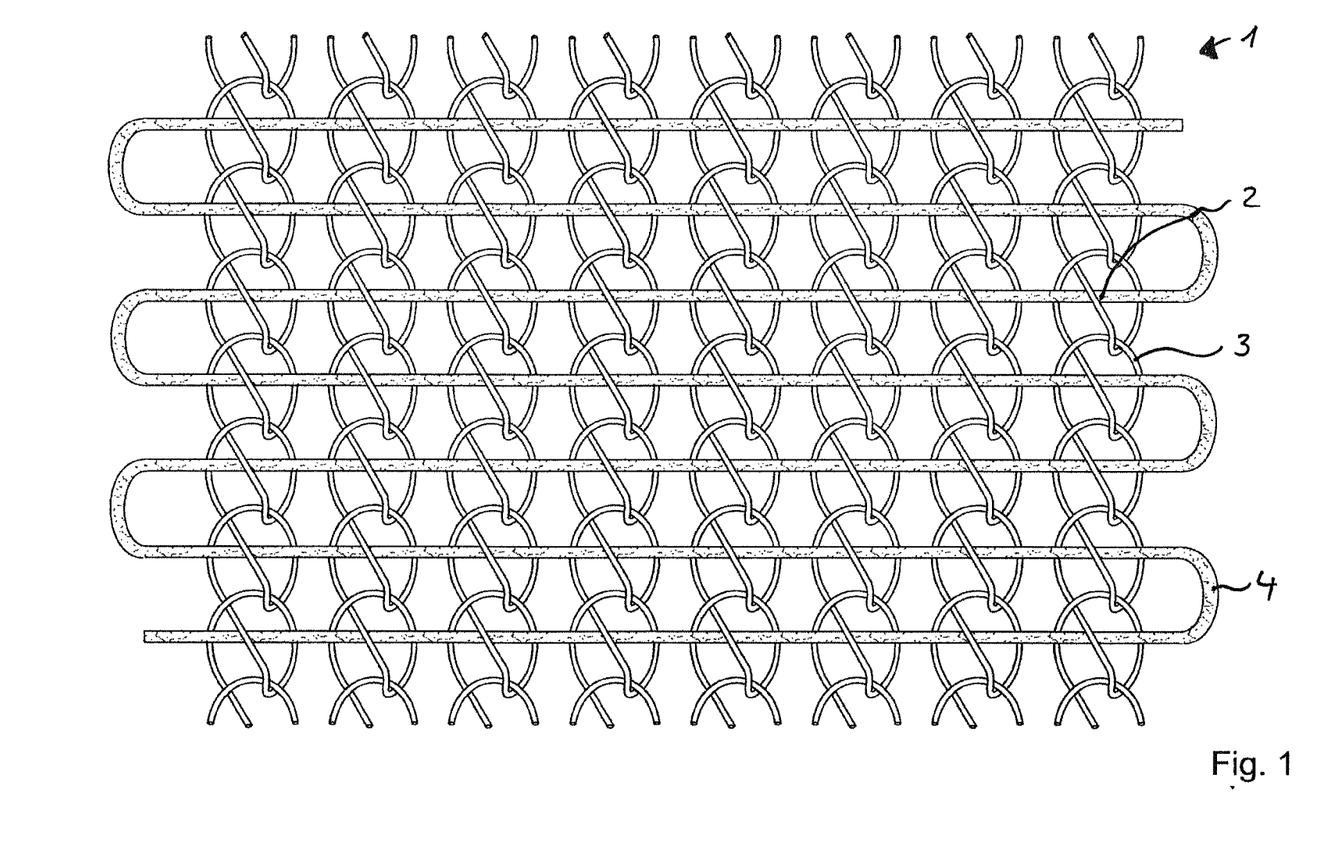
FIG. 1 is a schematic top view of a first embodiment of a hybrid steel-textile reinforcement ply according to the present invention.

FIG. 1 is a schematic top view of a hybrid steel-textile reinforcement ply 1 according to the present invention.

A hybrid steel-textile reinforcement ply 1 comprises a continuous weft inserted steel cord 2. The hybrid steel-textile ply 1 has a knit structure of textile yarns 3 running in the warp direction. The weft inserted steel cord 2 is placed essentially perpendicular to the longitudinal axis of the textile knit or weave direction (warp) and has continuous edges 4.

Figure 2:
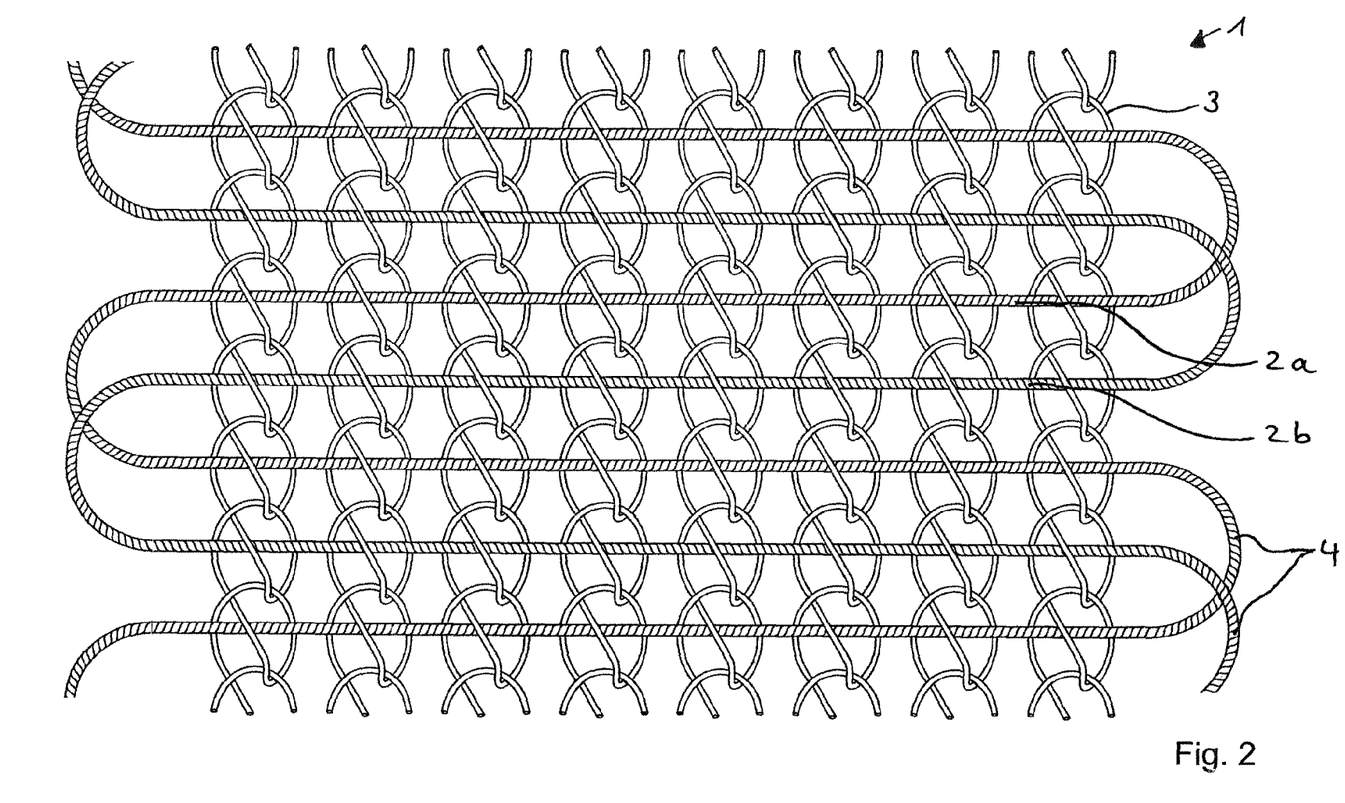
FIG. 2 is a schematic top view of a second embodiment of a hybrid steel-textile reinforcement ply according to the present invention.

According to a second embodiment, as shown in FIG. 2, the hybrid steel-textile ply 1 comprises all structures of the first embodiment shown in FIG. 1 but here two alternating steel cords 2a and 2b are weft inserted in the weave or knit structure of the textile cords 3 e.g. the steel cords are preferably trapped by stitching. Like that, the continuous bending edges 4 of the steel cord can have a wider diameter.

Figure 3:
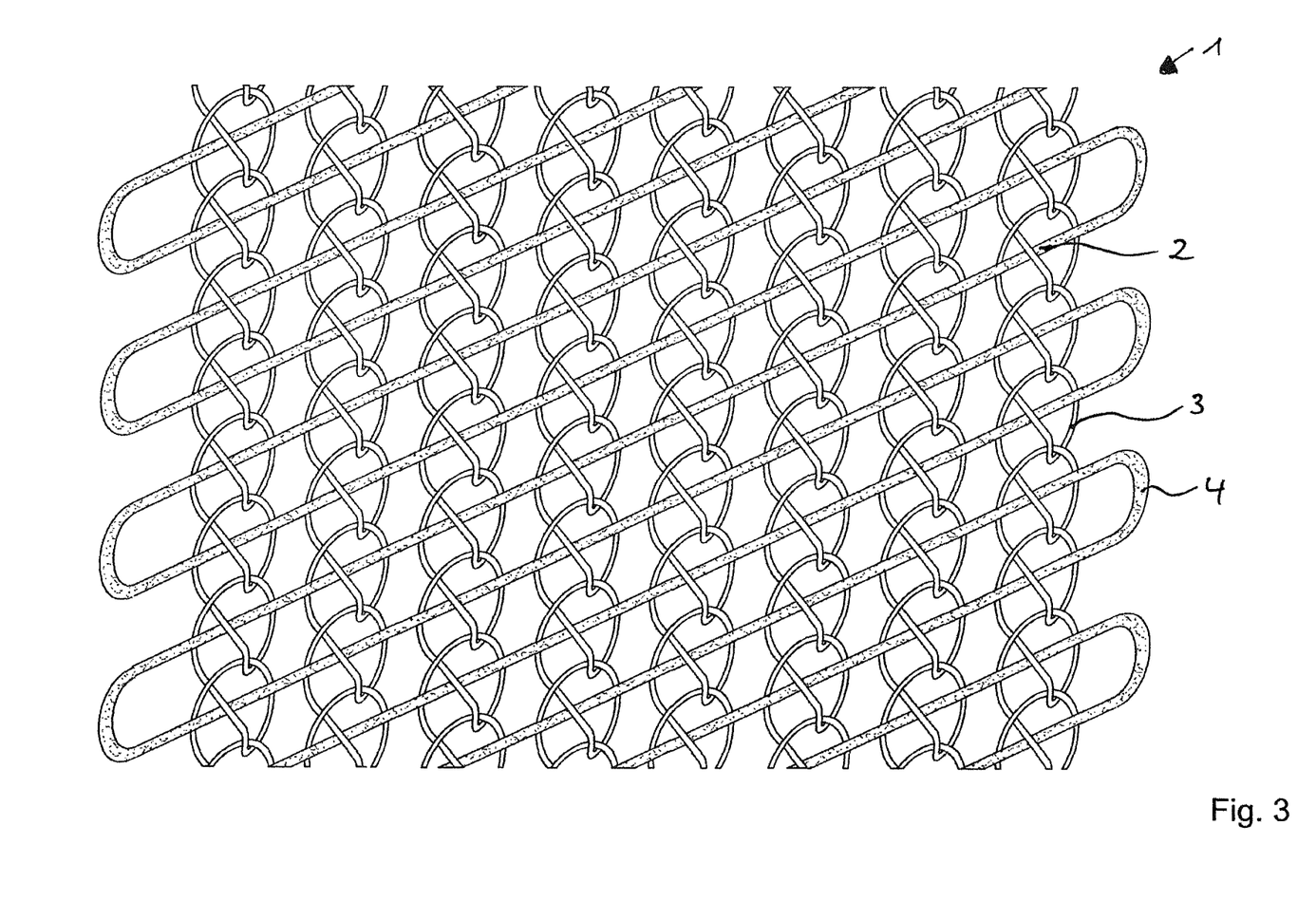
FIG. 3 is a schematic top view of a third embodiment of a hybrid steel-textile reinforcement ply according to the present invention.

A third embodiment of a hybrid steel-textile reinforcement ply 1 according to the present invention is shown in FIG. 3. It is based on the first embodiment shown in FIG. 1 but the steel cord 2 is not essentially perpendicular to the warp direction of the textile knit or weave but at a skewed angle. Preferably, the skewed angel is chosen in a range of +15° and −15° from the perpendicular orientation.

Figure 4:
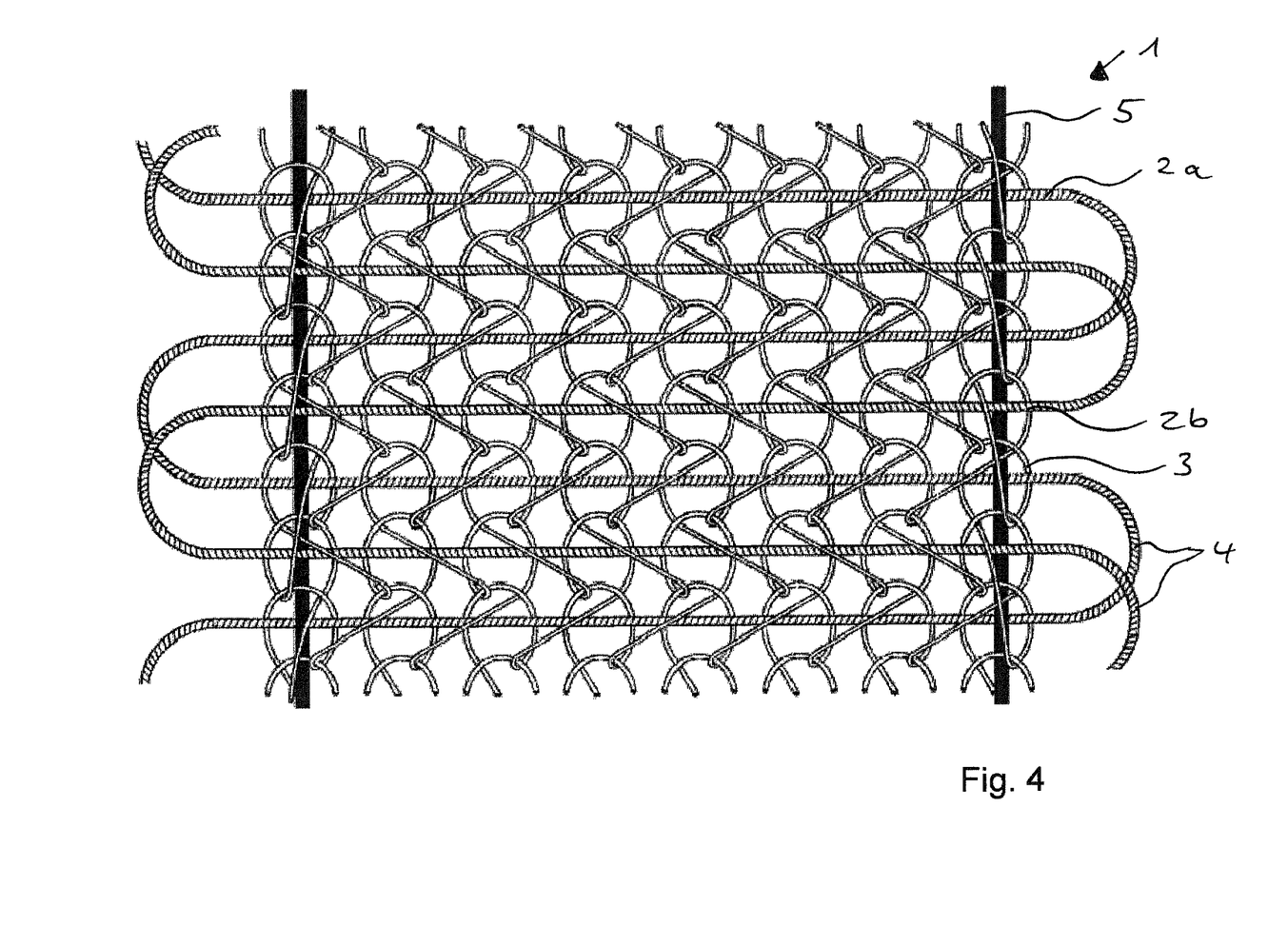
FIG. 4 is a schematic top view of a fourth embodiment of a hybrid steel-textile reinforcement ply according to the present invention.

A fourth and preferred embodiment of a hybrid steel-textile reinforcement ply according to the present invention is shown in FIG. 4. In this embodiment, the hybrid textile ply 1 comprises an additional steel cord 5 as reinforcement of the continuous edges 4. Thus, the additional steel cord reinforcement runs parallel to the textile weave or knit direction. Like that, two different types of reinforcing steel cords 2a, 2b and 5 can be incorporated in the same ply fulfilling different functions.

In this case, the advantages of the continuous edges of the hybrid steel-textile ply work well against the drawbacks of cut steel cords usually found in belt plies. At the same time, the structure provides a protection for the tread of the tire and fretting of the continuous edges can be diminished.

Figure 5:
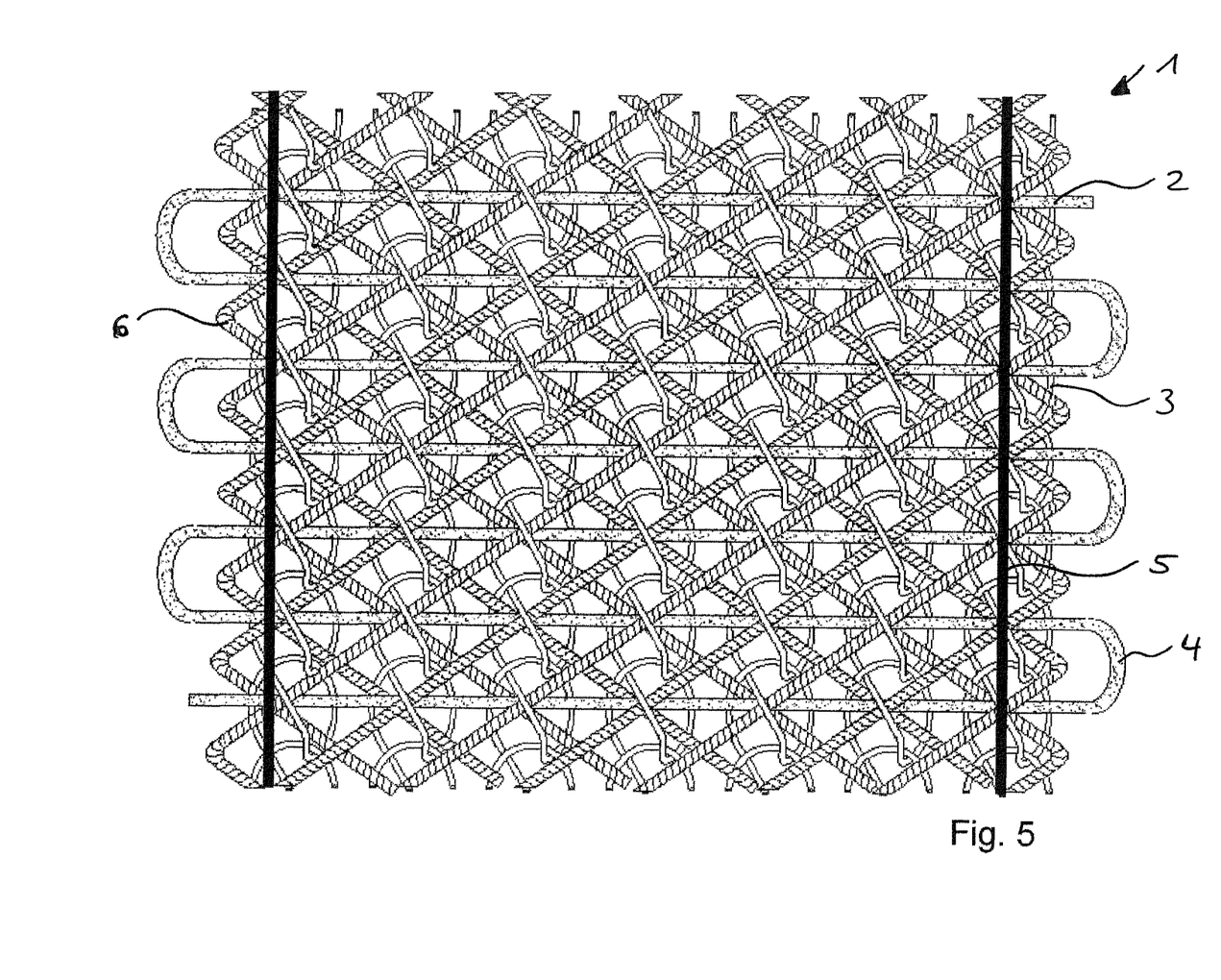
FIG. 5 is a schematic top view of a fifth embodiment of a hybrid steel-textile reinforcement ply according to the present invention.

A fifth and especially preferred embodiment of a hybrid steel-textile reinforcement ply according to the present invention is shown in FIG. 5. In this embodiment, the general structure of the fourth embodiment is further reinforced by another, third type of steel cords 6. The additional reinforcing steel cords 6 run at an angle to the perpendicular orientated first type of weft inserted steel cords 2 as well as to the reinforcement type steel cords at the edges running longitudinally with the weave or knit direction. All three types of steel cords are commonly held in place by the weave or knit textile structure 3 e.g. the steel cords are preferably trapped by stitching. With such a reinforced ply it is possible to combine all functions of the usually at least two conventional belt plies as well as the function of the cap ply in one single ply structure.

In any of the embodiments of the present invention the steel cord can be weft inserted in the textile yarn in a maximum skewed angle of up ±15° from the essentially perpendicular orientation to the warp direction of the ply and a specific embodiment is shown in FIG. 3. For any of the embodiments of the present invention, once a ply is produced, it is relatively easy to implement mechanical techniques that will provide a displacement of each side of the tape with respect to each other to induce a skewing of the material to dispose the steel-cords at an angle other than the original direction, perpendicular to the warp direction of the ply. One example of a displacement technique that could conceivably be employed with any of the embodiments of the present invention, is by using displacement pin wheels.

In any of the embodiments of the present invention two continuous steel cords can be alternately weft inserted in the textile yarn and a specific embodiment is shown in FIG. 2. In any of the embodiments of the present invention the hybrid structure can comprise three or more continuous steel cords that are in turn weft inserted in the textile yarn. These one, two are three continuous steel cords are arranged substantially parallel to one another and form a layer of reinforcement cords in the ply.

In any of the embodiments of the present invention, the steel cord can be weft inserted in a shuttle. If one steel cord and one steel cord shuttle is employed, then the density of the wefts would be limited by the need to accommodate the bending radius of the steel cord at the edges as the steel cord is looped back to make the next weft (hence avoiding a cut edge). To overcome this, it is advantageous for any of the embodiments of the present invention that two or more shuttles and two or more steel cords are employed in a subsequent manner so each shuttle waits at an edge for some predefined number of weaving cycles, so there is only one weft steel cord in each shed. Alternating shuttles as described above has been historically employed to change colours in a textile cloth. Due to speed restrictions, these machines are no-longer used in the textile industry. An additional advantage of employing more than one shuttle is that each shuttle can float for a while at the edge, resulting in a longer radius before the steel cord returns in the other direction, thereby minimizing the bulgy-parts at the edges. Finally, for any of the embodiments of the present invention, the possibility of displacing the weft at an angle other than perpendicular to the warp direction of the ply is well known, as described for example in U.S. Pat. No. 5,394,906 for composite preform weaving.

In any embodiment where at least two steel cords are used, the two steel cords can have different twist orientations, S (left hand or counter-clockwise turning filaments or strands when evolving along the cord) and Z (right hand, clockwise turning filaments or strands when evolving along the cord), so that the twist is balanced. Two cords with opposite directions can be combined on a single shuttle which greatly improves the end-count of the ply i.e. the number of cords per transversal unit of length and leading to a good torsion balance. Then care is preferably exercised to select proper steel cords that enable rubber penetration between the pair to prevent fretting of the cords against one another. Advantageously for the any of the embodiments of the present invention, it is possible to have alternating wefts of steel cord with different twist directions. Two shuttles, one with Z direction and the other with S direction twist, could be used to provide alternately weft with S- and Z-twist in the tape product. In this way, the tendency of the steel cord to twist on bending leading to the rise at the edge of the tape is then reduced as the residual twisting balances.

For any of the embodiments of the present invention, the edges of the steel cord ply can be reinforced with a continuous cord of extensible material which runs longitudinally in the direction of the ply. In this way a cap ply integral to the ply is formed. With this it is possible to minimize belt edge separation at high driving speeds. For any of the embodiments of the present invention, such an edge reinforcement material could also be a woven material such as a textile material.

For any of the embodiments of the present invention, the extensible material can be preferably chosen from the group comprising steel cord, glass fibre, nylon, polyester, rayon, and aramid.

For any of the embodiments of the present invention, when steel cord is selected for the edge reinforcement, the cord is preferably of the elongation or high elongation cord type. Such a cord shows a low modulus at low elongation which gradually increases at high elongation. That is why they are sometimes referred to as bimodal cords. Usually this is achieved by a Lang's lay type of steel cord i.e. a multi-strand steel cord in which the filaments in the strands are twisted in the same direction as the strands in the cord. Examples are 3×4×0.20 SS i.e. three strands twisted in S direction, each strand comprising four filaments of 0.20 mm diameter twisted in S direction or 3×3×0.175 SS. For any of the embodiments of the present invention, another alternative is to use cords with highly deformed filaments as described in EP 1036235. Such cords can stretch till the filaments are straight and then take up the load. For any of the embodiments of the present invention, still another alternative is to use a hybrid steel cord wherein the core comprises a polymer monofilament that is easily compressible such as e.g. described in EP 1646750 which is incorporated herein by reference. Under load the monofilament is compressed until the strands take over the full load.

In any of the embodiments of the present invention at least one additional reinforcement cord or cords can be inserted in the weft at an angle to the warp direction of the ply, different from the angle of the first reinforcement cord layer as is shown in a specific embodiment in FIG. 4. In this way a second reinforcement cord layer is formed. For any of the embodiments of the present invention, e.g. see FIG. 5, the number of weft inserted reinforcement cord layers can even be three, each of the cords having a specific angle relative to the warp direction of the ply.

In this way, there can be up to three different layers of reinforcing steel cords in any of the embodiments of the present invention, e.g. combined in a single ply, each of the layers comprising a specific type of steel cord or cords. In any of the embodiments of the present invention, all steel cords can be commonly held in place by the knit textile structure. With such a reinforced ply it is possible to combine all functions of the usually at least two conventional belt plies as well as the function of the cap ply in one single ply structure.

For any of the embodiments of the present invention, the steel cords of the weft should be selected in function of their role in the ply:

When impact resistance of the belt is important, the same type of cords described as usable for the longitudinal edge reinforcement can be used in the weft (i.e. cords of the elongation or high elongation type).

when the belt layers have to be stiff a cord of type n×d or (n+m)×d is most preferred. The first type is made of 'n' filaments with 'n' preferably ranging from 1 to 5 filaments of a diameter 'd' (expressed in mm). Diameter 'd' can, for example, vary from 0.15 to 0.45 mm. The filaments are twisted together. The most notable example used is 2×0.30 mm. The second type '(n+m)×d' comprises two groups of filaments that are twisted around each other. One of the groups preferably has the same twist as the groups in cord, while the other group has no twist or a very long twist. The most notable example is (2+2)×0.25. Other examples as published in WO 02/088459 (incorporated herein by reference) are also useable for the inventive hybrid textile ply.

Also a single, possibly crimped or otherwise deformed, filament is possible to be used in the inventive hybrid textile ply Alternatively or additionally to the preceding the steel cord can be of a layered type with two or more layers of twisted filaments. Such preferred constructions are flexible constructions comprising many filaments that are fine. Well known examples are cords of the layered type such as three layered cords (L+M+N)×d wherein L<M<N. Possible examples include filament numbers in the range of $17 \geq L+M+N \geq 30$ and d can vary from 0.08 to 0.175 mm. They are built up in layers. First, L filaments are twisted together with a first lay and lay direction to a core. Then M filaments are twisted around them with a second lay direction and length, followed by still another layer with N filaments that are twisted around the L+M with still another third lay direction and length.

Also two layered constructions of type (L+M)×d are preferred. Possible examples include filament types with L<M and $7 \geq L+M \geq 19$ with d also varying between 0.08 to 0.175 mm. A specific example is (2+7)×0.10.

Alternatively, but still preferred, single lay cords with M filaments all having the same lay direction and length can be used. The filaments or all filaments need not be identical. Particular examples are those published in WO 2008/080715 and WO 2005/014924.

For any of the embodiments of the present invention, the steel cord for the weft are by preference of the highest possible strength. At present a 0.30 mm filament has a tensile strength higher than 2950 MPa, or even higher as 3300 MPa, while 3600 MPa is also achievable.

In any of the embodiments of the present invention, at least two layers of steel cord can be super-imposed to give a 3D structure of the resulting ply.

The advantages over a single layer include that production speed is much higher; the angle of one array of cords relative to the other is fixed; and a built up of bulgy overlaps at the edges are less problematic because the overlaps are spread. Both S and Z twisted steel cords can be used to make a balanced structure.

The present invention also provides a method for manufacturing a hybrid steel-textile, woven or knitted reinforcement ply for tires comprising at least one continuous steel cord, and at least one textile yarn, wherein the continuous steel cord is weft inserted in the textile yarn and wherein the steel cord in the edges of the reinforcement ply is continuous by a weft insertion warp knit or weave technique.

There are a number of textile based methods for production of a steel-cord product of a predefined width with continuous steel cord disposed at an angle 90° to the direction of production. Since the width of the product is very small compared to the length (quasi continuous), and the thickness is very small, we will refer to this material as a "tape".

A tape with said properties can be manufactured using simple weaving techniques, where an array of textile yarns, such as polyamide, are arranged to form a shed whereby a shuttle containing steel cord is weft inserted.

Although there are numerous limitations in this technique, it is still possible but not preferred to manufacture a ply according to the present invention using this method. From a production perspective, the continuous length of production is limited to the length of steel cord on the spool in the shuttle. Replacing the spool in the shuttle results in a steel cord connection (such as a weld) in the tape. Additionally, the shuttle would be large to accommodate the spool for three reasons: the steel cord has a limited bending radius compared to textile yarns, the thickness of a steel cord is large relative to textile yarns traditionally used in shuttle tape weaving, and the length of the steel cord on the bobbin should be long to reduce the number of joins. Consequently, the speed of weaving would be slow compared to current standards because a relatively large shed would be needed to accommodate the large shuttle. With regard to the final product, the stability of a steel cord weft and polymer yarn weave is not very stable to mechanical deformation until fixed in rubber. This could be overcome to some extent by using more intricate weaving techniques, such as leno weaving, but the speed of weaving compared to a simple plain weave is again reduced. Another technique for manufacture of a steel cord tape is needle weaving. This technique overcomes the need for a large shed because the weft is inserted via a needle or rapier from a bobbin that does not pass between the shed from one side of the weave to the other as in shuttle weaving. The main disadvantage of this technique for tire applications is that there are two wefts in each shed. Since these two wefts always come from the same spool they have the same direction of twist, consequently, there is a high probability that the wefts will twist about each other. Two needles can also be employed, e.g. for a multiple-shuttle loom, so that there is an equal number of Z and S steel cords in the weave, but there will always be two picks per shed coming from one bobbin, so the problem of cords twisting about each other is not necessarily overcome. Another drawback of this technique is that the double weft will always have a small radius of curvature at one side of the structure, and this cannot be overcome. The possibility of displacing the weft at an angle other than 90° to the warp is also well known, in needle weaving as described in GB 2102035 which is incorporated herein by reference.

Therefore, the preferred technique according to the present invention is long throw weft insertion warp knit or crochet. This technique has the advantages of needle weaving in that the whole bobbin of steel cord is not displaced during manufacture, with an additional advantage over needle weaving in that cords cannot twist about each other. Moreover, more than one cord can be utilized in production of the product so as to balance the structure. In it's simplest form, crochet weft insertion can consist of a series of stitches, holding a steel cord. The warp knit of this technique also can be skewed to predetermined angle.

More than one steel cord can be alternately inserted to give better edges with less residual stresses, e.g. by bulgy overlaps, and balanced S and Z orientation of the steel cords. More complex stitch pattern will result in more stable structure, such as a tricot stitch instead of a simple chain. The angle is not fixed and can easily be changed from one product to another. It can be made on existing machinery.

The hybrid steel-textile reinforcement ply according to the present invention is preferably used in tires for passenger cars and/or heavy load vehicle.

While the invention has been shown and described with reference to preferred embodiments, it will be understood by those skilled in the art that various changes or modifications in form and detail may be made without departing from the scope and spirit of this invention.

The invention claimed is:

1. A hybrid steel-textile ply having a warp direction and a weft direction, said hybrid steel-textile ply having edges in said warp direction, said hybrid steel-textile ply for the reinforcement of tires, comprising:
    at least one continuous steel cord, and
    at least one textile yarn,
    wherein the continuous steel cord is weft inserted in the textile yarn,
    wherein the steel cord is held by a series of warp knit stitches in said at least one textile yarn,
    wherein said series of stitches are running in said warp direction,
    and wherein the steel cord in the edges of the reinforcement ply is continuous.

2. The hybrid steel-textile ply according to claim 1, having edges in the warp direction, wherein the steel cord is weft inserted in the textile yarn in a direction not essentially perpendicular to said warp direction at a skewed angle in a range of −15° and +15° from a direction essentially perpendicular to the warp direction.

3. The hybrid steel-textile ply according to claim 1, wherein two or more continuous steel cords are in turn weft inserted in the textile yarn.

4. The hybrid steel-textile ply according to claim 3, wherein the steel cords have different twist orientations S and Z.

5. The hybrid steel-textile ply according to claim 1, wherein the continuous steel cord in the edges is reinforced with one or more continuous cords of extensible material which runs longitudinally in the warp direction of the ply.

6. The hybrid steel-textile ply according to claim 5, wherein the extensible material is selected from the group consisting of steel cord, glass fibre, nylon, polyester, rayon, and aramid.

7. The hybrid steel-textile ply according to claim 1, wherein at least two layers of steel cord are super-imposed to give a 3D structure of the resulting ply.

8. The hybrid steel-textile ply according to claim 1, wherein at least one reinforcement cord is inserted in the weft at an angle to the essentially perpendicular running steel cord.

9. The hybrid textile ply according to claim 1, wherein the steel cord is of the type n×d or (n+m)×d
    with n and m representing the number of filaments and with d representing the diameter of the filament.

10. The hybrid textile ply according to claim 1, wherein the steel cord is of a layered type with two or more layers of twisted filaments.

* * * * *